US009674303B1

(12) United States Patent
Klemin et al.

(10) Patent No.: US 9,674,303 B1
(45) Date of Patent: Jun. 6, 2017

(54) METHODS AND SYSTEMS FOR EFFICIENT DATA TRANSMISSION IN A DATA CENTER BY REDUCING TRANSPORT LAYER PROCESSING

(71) Applicant: QLOGIC, Corporation, Aliso Vlejo, CA (US)

(72) Inventors: Bruce A. Klemin, Rocklin, CA (US); Raymond Chow, Folsom, CA (US); Dean Scoville, Rocklin, CA (US)

(73) Assignee: QLOGIC, Corporation, Aliso Viejo, CA (US)

( * ) Notice: Subject to any disclaimer, the term of this patent is extended or adjusted under 35 U.S.C. 154(b) by 193 days.

(21) Appl. No.: 14/548,040

(22) Filed: Nov. 19, 2014

(51) Int. Cl.
*H04L 29/08* (2006.01)
*H04L 12/24* (2006.01)
*H04L 29/06* (2006.01)
*G06F 3/06* (2006.01)

(52) U.S. Cl.
CPC .............. *H04L 67/32* (2013.01); *H04L 67/14* (2013.01); *G06F 3/0601* (2013.01); *G06F 3/067* (2013.01); *G06F 3/0635* (2013.01); *H04L 41/04* (2013.01); *H04L 67/1097* (2013.01); *H04L 69/161* (2013.01); *H04L 69/18* (2013.01); *H04L 69/326* (2013.01)

(58) Field of Classification Search
CPC ...................................................... H04L 67/32
See application file for complete search history.

(56) References Cited

U.S. PATENT DOCUMENTS

| | | | | |
|---|---|---|---|---|
| 7,310,478 | B1 * | 12/2007 | Norman | H04J 14/0227 398/3 |
| 7,937,447 | B1 * | 5/2011 | Cohen | H04L 67/1097 709/212 |
| 2005/0188074 | A1 * | 8/2005 | Voruganti | H04L 69/12 709/224 |
| 2006/0013251 | A1 * | 1/2006 | Hufferd | H04L 67/1097 370/466 |
| 2006/0235977 | A1 * | 10/2006 | Wunderlich | H04L 67/1097 709/227 |
| 2007/0297334 | A1 * | 12/2007 | Pong | H04L 69/16 370/235 |
| 2008/0037443 | A1 * | 2/2008 | Ansari | H04L 65/80 370/254 |
| 2008/0310422 | A1 * | 12/2008 | Booth | H04L 12/4641 370/395.53 |
| 2009/0285234 | A1 * | 11/2009 | McConnell | H04L 69/18 370/469 |
| 2010/0175073 | A1 * | 7/2010 | Hu | H04L 69/32 719/326 |
| 2013/0028088 | A1 * | 1/2013 | Do | H04L 1/0002 370/235 |

(Continued)

*Primary Examiner* — Backhean Tiv
(74) *Attorney, Agent, or Firm* — Klein, O'Neill & Singh, LLP (57) ABSTRACT

Methods and systems for network communications are disclosed. The target device receives a request for a network connection from an initiator device, the request indicating a desire to bypass transport communication layer processing. The target device accepts the request and sends a response to the initiator device indicating an agreement to bypass the transport layer processing. The target device then receives a frame from the initiator device and processes the frame by bypassing the transport communication layer processing.

20 Claims, 6 Drawing Sheets

(56) References Cited

U.S. PATENT DOCUMENTS

| | | | |
|---|---|---|---|
| 2013/0114606 A1* | 5/2013 | Schrum, Jr. | H04L 45/023 370/395.53 |
| 2014/0233574 A1* | 8/2014 | Dixon | H04L 47/624 370/394 |
| 2015/0180766 A1* | 6/2015 | Racz | H04L 47/122 370/218 |

* cited by examiner

METHODS AND SYSTEMS FOR EFFICIENT DATA TRANSMISSION IN A DATA CENTER BY REDUCING TRANSPORT LAYER PROCESSING

TECHNICAL FIELD

The present invention relates to network systems and, in particular, to network communications.

BACKGROUND

Computing systems are commonly used today. A computing system often communicates with a peripheral device for performing certain functions, for example, reading and writing information. Oftentimes, computer systems utilize protocols, for example, the Internet Small Computer System Interface (iSCSI) protocol to help transfer data from one computing system to another or from one computing system to a storage system across a network. Typically iSCSI based communication also utilize the Transmission Control Protocol (TCP) to provide reliability between a source node and a destination node. Continuous efforts are being made to improve communication between computing systems and devices.

SUMMARY

The various present embodiments have several features, no single one of which is solely responsible for their desirable attributes. Without limiting the scope of the present embodiments as expressed by the claims that follow, their more prominent features now will be discussed briefly. After considering this discussion, and particularly after reading the section entitled "Detailed Description," one will understand how the features of the present embodiments provide the advantages described herein.

In one aspect, a machine implemented method is provided. The method includes receiving a request at a target device for a network connection from an initiator device, the request indicating a desire to bypass transport communication layer processing; accepting the request by the target device; sending a response to the initiator device indicating an agreement to bypass the transport layer processing; receiving a frame from the initiator device at the target device; and processing the frame by the target device bypassing the transport communication layer processing.

In another aspect, a non-transitory, machine readable storage medium having stored thereon instructions for performing a method comprising machine executable code is provided. The code when executed by at least one machine, causes the machine to: receive a request at a target device for a network connection from an initiator device, the request indicating a desire to bypass transport communication layer processing; accept the request by the target device; send a response to the initiator device indicating an agreement to bypass the transport layer processing; receive a frame from the initiator device at the target device; and process the frame by the target device bypassing the transport communication layer processing.

In yet another aspect, a memory containing machine readable medium comprising machine executable code having stored thereon instructions is provided. A processor module coupled to the memory is configured to execute the machine executable code to: receive a request at a target device for a network connection from an initiator device, the request indicating a desire to bypass transport communication layer processing; accept the request by the target device; send a response to the initiator device indicating an agreement to bypass the transport layer processing; receive a frame from the initiator device at the target device; and process the frame by the target device bypassing the transport communication layer processing.

This brief summary has been provided so that the nature of the disclosure may be understood quickly. A more complete understanding of the disclosure can be obtained by reference to the following detailed description of the embodiments thereof concerning the attached drawings.

BRIEF DESCRIPTION OF THE DRAWINGS

The various embodiments relating to facilitating communication between devices in a network now will be discussed in detail with an emphasis on highlighting the advantageous features. These novel and non-obvious embodiments are shown in the accompanying drawings, which are for illustrative purposes only. These drawings include the following figures, in which like numerals indicate like parts.

DETAILED DESCRIPTION

The following detailed description describes the present embodiments with reference to the drawings. In the drawings, reference numbers label elements of the present embodiments. These reference numbers are reproduced below in connection with the discussion of the corresponding drawing features.

As a preliminary note, any of the embodiments described with reference to the figures may be implemented using software, firmware, hardware (e.g., fixed logic circuitry), manual processing, or a combination of these implementations. The terms "logic," "module," "component," "system," and "functionality," as used herein, generally represent software, firmware, hardware, or a combination of these elements. For instance, in the case of a software implementation, the terms "logic," "module," "component," "system," and "functionality" represent program code that performs specified tasks when executed on a hardware processing device or devices (e.g., CPU or CPUs). The program code can be stored in one or more non-transitory computer readable memory devices.

More generally, the illustrated separation of logic, modules, components, systems, and functionality into distinct units may reflect an actual physical grouping and allocation of software, firmware, and/or hardware, or can correspond to a conceptual allocation of different tasks performed by a single software program, firmware program, and/or hardware unit. The illustrated logic, modules, components, systems, and functionality may be located at a single site (e.g., as implemented by a processing device), or may be distributed over a plurality of locations.

The term "machine-readable media" and the like refers to any kind of non-transitory storage medium for retaining information in any form, including various kinds of storage devices (magnetic, optical, static, etc.).

The embodiments disclosed herein, may be implemented as a computer process (method), a computing system, or as an article of manufacture, such as a computer program product or computer-readable media. The computer program product may be non-transitory computer storage media, readable by a computer device, and encoding a computer program of instructions for executing a computer process.

Typical iSCSI solutions utilize the TCP protocol to provide reliability between a source computing node communicating with a destination computing node. This may have negative consequences because TCP processing results in additional computing processing requirements and time in handling frame transmission between the network nodes. In certain environments, like a lossless data center environment, certain aspects of the TCP may not be needed. For example, a network fabric may ensure reliability without having to use TCP. However, conventional systems using iSCSI and TCP do not provide a mechanism to bypass TCP processing or selectively reduce TCP processing.

As such, in one aspect, a modified communications protocol stack is desirable to make network frame processing more efficient in certain environments. In one aspect, a computing system that utilizes iSCSI in a lossless environment includes an ordering shim layer that does limited processing of a network frame and bypasses TCP protocol processing when both a sending computing node (or system) and a receiving computing node (or system) have agreed to bypass TCP protocol processing. In one aspect, standard iSCSI connections and TCP bypass iSCSI connections co-exist within the same infrastructure, as described below in detail.

Figure 1A:
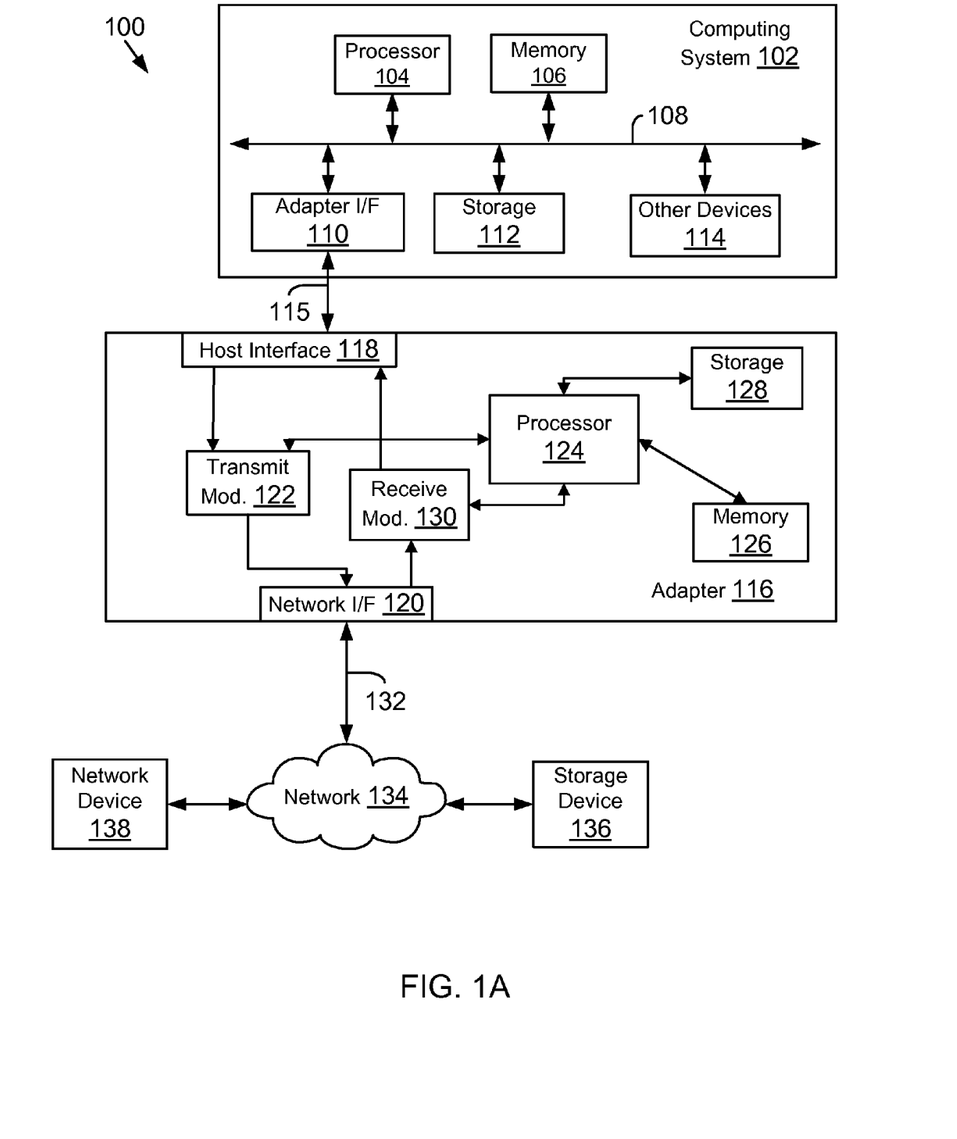
FIG. 1A is a functional block diagram of a system, used according to one aspect of the present disclosure.

System:

FIG. 1A is a block diagram of a system 100 configured for use with the present embodiments. The system 100 may include one or more computing system(s) 102 (may also be referred to as "host system 102") coupled to another device via a link 115, for example, an adapter 116 that interfaces with a network 134. The network 134 may include, for example, additional computing systems 102 (not shown), storage device(s) 136 (that may operate as a target device), network device(s) 138, servers, storage systems and others.

In one aspect, the network 134 may include a local area network (LAN), a storage area network (SAN), a wide area network (WAN), a virtual private network (VPN), the Internet, combinations of the same, or the like. In one aspect, storage device 136 and network device 138 may include similar modules as those described with respect to computing system 102. Host system 102 (or adapter 116) may be referred to as an initiator and the storage device 136 may be referred to as a target device or target system.

The computing system 102 may include one or more processors 104, also known as a central processing unit (CPU). Processor 104 may be, or may include, one or more programmable general-purpose or special-purpose microprocessors, digital signal processors (DSPs), programmable controllers, application specific integrated circuits (ASICs), programmable logic devices (PLDs), or the like, or a combination of such hardware devices.

The processor 104 executes computer-executable process steps and interfaces with an interconnect (or computer bus) 108. The computer bus 108 may include, for example, a system bus, a Peripheral Component Interconnect (PCI) bus (or PCI-Express (PCIe) bus), a HyperTransport or industry standard architecture (ISA) bus, a SCSI bus, a universal serial bus (USB), an Institute of Electrical and Electronics Engineers (IEEE) standard 1394 bus (sometimes referred to as "Firewire"), and/or any other interconnect type.

An adapter interface 110 facilitates the ability of the computing system 102 to interface with the adapter 116 via the link 115. Link 115 may be an interconnect system, for example, a PCIe bus. The computing system 102 also includes other devices and interfaces 114, which may include a display device interface, a keyboard interface, a pointing device interface, etc. Details regarding the other devices 114 are not germane to the embodiments disclosed herein.

The computing system 102 may further include a storage device 112, which may include for example a hard disk (HDD), a solid state drive (SSD), a hybrid drive (sometimes referred to as an SSHD), a CD-ROM, a non-volatile memory device (flash or memory stick) and/or any other mass storage device. Storage 112 may store operating system program files, application program files, and other files. Some of these files are stored on storage 112 using an installation program. For example, the processor 104 may execute computer-executable process steps of an installation program so that the processor 104 can properly execute the application program.

Memory 106 also interfaces to the computer bus 108 to provide the processor 104 with access to memory storage. Memory 106 may include random access main memory (RAM). When executing stored computer-executable process steps from storage 112, the processor 104 may store and execute the process steps out of RAM. Read only memory (ROM, not shown) may also be used to store invariant instruction sequences, such as start-up instruction sequences or basic input/output system (BIOS) sequences for operation of a keyboard (not shown).

With continued reference to FIG. 1A, link 115 and the adapter interface 110 couple the adapter 116 to the computing system 102. The adapter 116 may be configured to handle both network and storage traffic. Various network and storage protocols may be used to handle network and storage traffic. Some common protocols are described below.

One common network protocol is Ethernet. The original Ethernet bus or star topology was developed for local area networks (LAN) to transfer data at 10 Mbps (mega bits per second). Newer Ethernet standards (for example, Fast Ethernet (100 Base-T) and Gigabit Ethernet) support data transfer rates between 100 Mbps and 10 Gbps. The descriptions of the various embodiments described herein are based on using Ethernet (which includes 100 Base-T and/or Gigabit Ethernet) as the network protocol. However, the adaptive embodiments disclosed herein are not limited to any particular protocol, as long as the functional goals are met by an existing or new network protocol.

iSCSI is an Internet Protocol-(IP-)based storage networking standard for linking data storage facilities. By carrying Small Computer System Interface (SCSI) commands over IP networks, iSCSI is used to facilitate data transfers over intranets and to manage storage over long distances. iSCSI can be used to transmit data over local area networks (LANs), wide area networks (WANs), or the Internet and can enable location-independent data storage and retrieval. The protocol allows clients to send SCSI commands (referred to as command or (control) data blocks (CDBs) to SCSI storage devices (may be referred to as targets) on remote servers. iSCSI is a SAN-based protocol, allowing organizations to consolidate storage into data center storage arrays while providing hosts (such as database and web servers) with the illusion of locally attached disks. Unlike traditional Fibre Channel, which uses special-purpose cabling, iSCSI can be run over long distances using existing network infrastructure. In one embodiment, adapter 116 may operate as an iSCSI initiator as well as a target for responding to input/output (referred to as I/O) requests for reading and writing information at storage device 136.

Referring back to FIG. 1A, adapter 116 interfaces with the computing system 102 via the link 115 and a host interface 118. In one embodiment, the host interface 118 may be a PCI Express interface having logic/circuitry for sending and receiving PCI-Express packets.

The adapter 116 also includes a network interface 120 that interfaces with link 132 via one or more ports (not shown) to network 134. The network interface 120 includes logic and circuitry to receive network packets via the network link 132 and pass it to a receive module 130 for handling. Additionally network link 132 includes logic and circuitry to send network packets over the network 134 coming from a transmit module 122. The transmit module 122 receives communication traffic from host interface 118. Adapter 116 also includes a receive module 130 that is used to process information received by network interface 120 from link 132 and destined for host system 102.

Both the transmit module 122 and receive module 130 may also interact with a processor 124 according to one aspect. In one aspect, processor 124 executes firmware instructions out of a memory 126 to control overall adapter operations. The adapter 116 may also include storage 128, which may be for example non-volatile memory, such as flash memory, or any other device. The storage 128 may store executable instructions and operating parameters that can be used for controlling adapter operations.

Figure 1B:
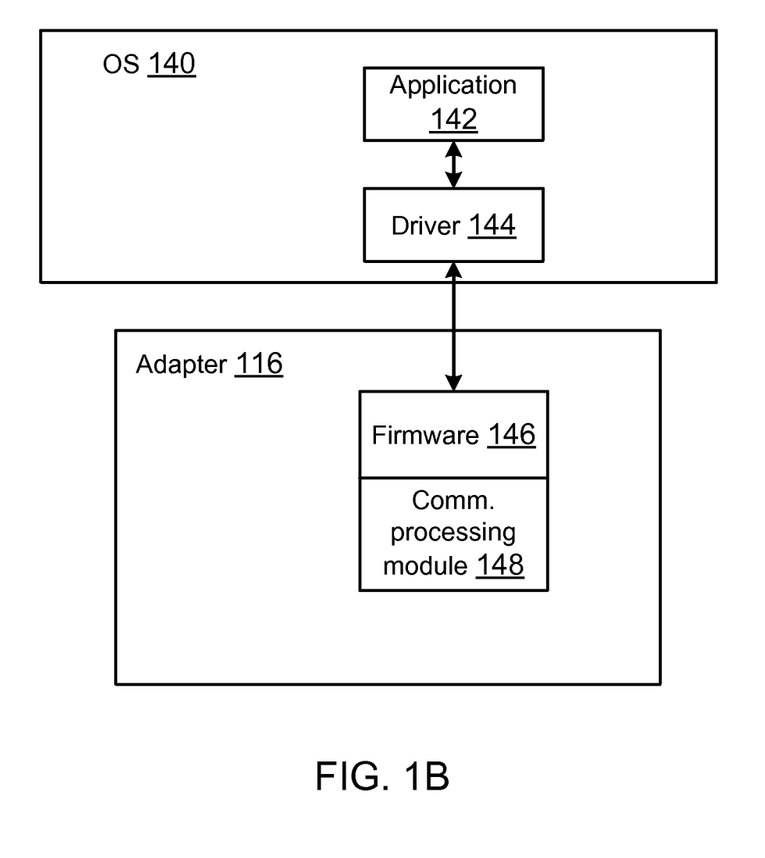
FIG. 1B is a functional block diagram showing components used for network communications in accordance with one aspect of the disclosure.

Software Architecture:

FIG. 1B shows an example of a generic software architecture used by system 100. Processor 104 executes an operating system 140 for controlling the overall operations of computing system 102. The operating system may include, for example, a version of iOS™, Windows® Operating System, Linux operating system, UNIX, Solaris, or any other operating system type. The disclosures herein are not limited to any particular operating system type.

An application 142 may be executed by processor 104 for performing certain functions. For example, application 142 may be an email program, a database application or any other application type. Application 142 may send a command to a driver 144 for performing an operation, for example, reading and/or writing data (I/O) at another storage device. The driver 144 processes the request and communicates with firmware 146 executed by processor 124 of adapter 116. A component of adapter 116 then processes the request.

In one aspect, a communication processing module 148 of the firmware 146 sets up and/or directs the processing of the I/O or other network communication as will be described in more detail herein. The communication processing module 148 enables bypassing transport layer processing, as described below in detail.

Figure 1C:
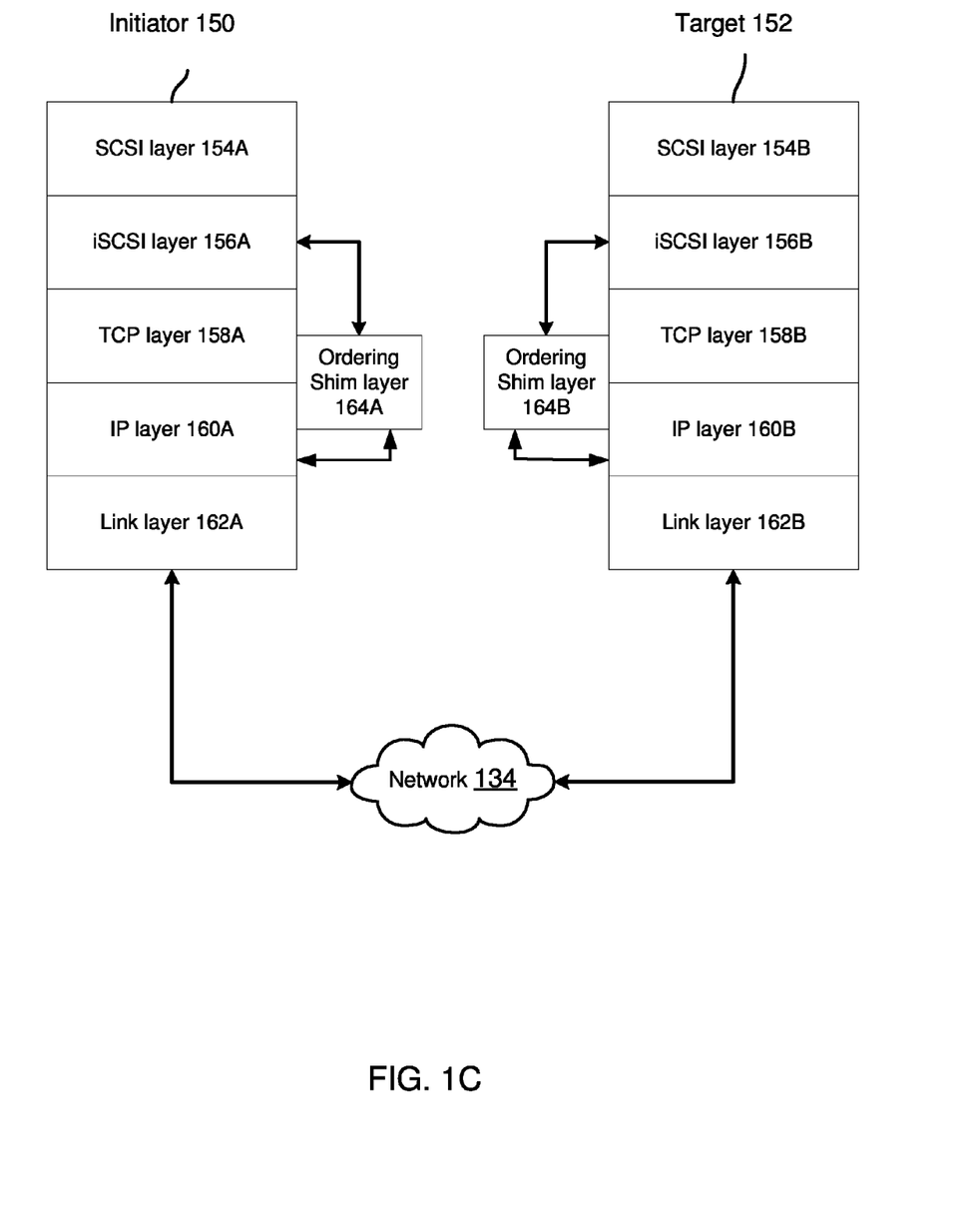
FIG. 1C is a functional block diagram of a communications stack used by an initiator and target according to one aspect of the present disclosure.

Communication Stack:

FIG. 1C illustrates an initiator communications stack 150 and a target communication stack 152 in accordance with one aspect of the disclosure. The initiator stack includes a SCSI layer 154A, an iSCSI Layer 156A, a TCP layer 158A, an IP layer 160A, a link layer 162A, and an order shimming layer 164A. The target stack 152 also includes a SCSI layer 154B, an iSCSI Layer 156B, a TCP layer 158B, an IP layer 160B, a link layer 162B, and an order shimming layer 164B. The communications stack, as illustrated, is an abstraction of a number of processing modules that may be implemented in hardware, software, firmware or a combination thereof, of systems as described above in FIGS. 1A and 1B. In various aspects, different layers may be carried out in the computing system 102 and the adapter 116. In another aspect, when the computing system 102 is acting as an initiator, the various layers may be distributed among application 142, driver 144, and adapter 116. Each layer of a communications stack typically communicates with the layer directly above and below it to carry out various functions for transmitting a particular communication from one system to another (generally referred to as an initiator and target).

In a typical system, the computing system 102 may utilize the SCSI protocol, implemented in the SCSI layer 154A, B in FIG. 1C, to physically connect and transfer data between computers and peripheral devices. However, this can be limited when working with large networks. As such, many systems implement SCSI commands over IP networks utilizing iSCSI, particularly for linking data storage facilities. The iSCSI protocol allows computing systems 102 (operating as an initiator) to send SCSI commands to SCSI storage devices, such as storage device 136, (operating as a target).

In FIG. 1C, the SCSI layer 154A communicates with iSCSI layer 156A to send out a SCSI request or command. The iSCSI layer 156A often relies on an underlying transport layer to establish connections and is generally responsible for end-to-end message transfer independent of the underlying network, along with error control, segmentation, flow control, congestion control, and application addressing (port numbers). In one aspect, the iSCSI layer 156A communicates using the TCP layer 158A that in turn relies on the IP layer 160A, to manage routing of packets across networks, such as network 134. TCP layer 156A and IP layer 158A operate as transport layers in network communication. The IP layer 160A communicates with the link layer 162A to move packets between the IP layer interfaces of two different computing devices on the same link. Oftentimes this is managed in hardware, such as network interface 120. The various layers in the target stack 152 communicate in a similar manner as the initiator stack 150.

In a typical system, computing system 102 acting as an initiator initiates the initiator communications stack 150. A SCSI command issued by application 142, for example, is communicated from the SCSI layer 154A to iSCSI layer 156A, which prepares the command for transmission over a network. The command is sent to TCP layer 158A, which in turn sends the command to the IP layer 160A. IP layer 160A uses the link layer 162A to send the command. The link layer 162A encapsulates the command in a frame and transmits the frame over network 134 to the target communication stack 152. The target stack 152 operate on the frame in the reverse order to decode the command from link layer 162B to IP layer 160B to TCP layer 158B to iSCSI layer 156B to SCSI layer 154B, which can execute on the command as sent.

While each layer is useful for specific tasks, they also use computing resources. Typical iSCSI solutions utilize TCP to provide reliability between a source and a destination node, but this may not always be necessary. In one aspect, for example, a system 100 may comprise a lossless data center environment. In such an environment, TCP reliability control may not be necessary or desired. As such, according to one aspect, the ordering shim layer 164A, 164B may be implemented within initiator communications stack 150 and target communication stack 152 and may be used to bypass most of TCP protocol processing in appropriate situations. In one aspect, the ordering shim layer 164A may provide minimal processing of packets to be sent, such as adding a typical TCP header to be included in a frame at the IP layer 160A. Similarly, the ordering shim layer 164B at a target may provide minimal processing, such as verifying frame order before passing frame packets up to the iSCSI layer 156B and bypassing the TCP layer 158B.

In one aspect, the ordering shim layer 164A may be handled at the firmware 146 level of adapter 116, for example, as part of the communication processing module 148. In another aspect, the ordering shim layer may be executed by the host system 102 and a target device or computing system. The various aspects described herein do not depend on the exact location of the operations within a given system.

Figure 2:
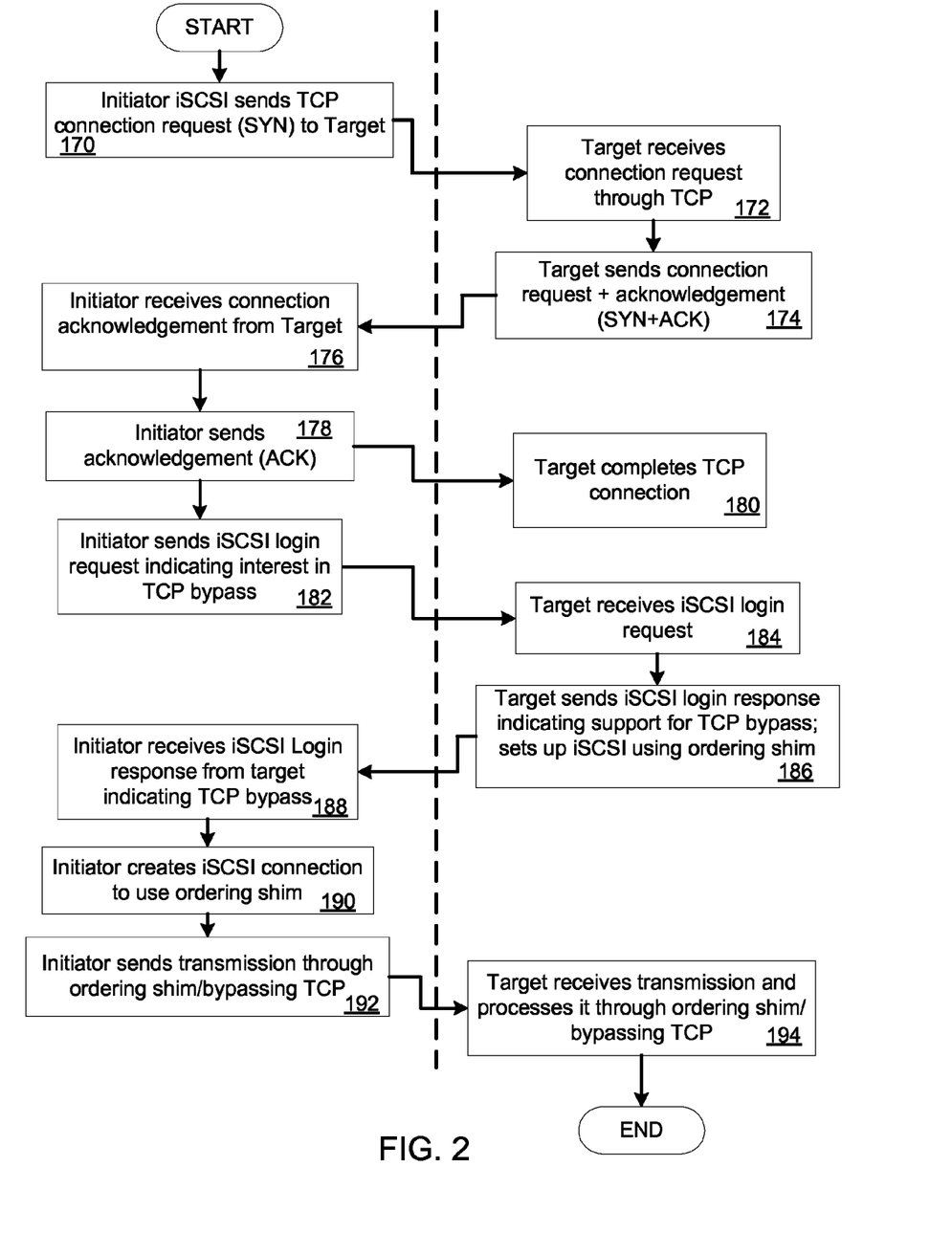
FIG. 2 is a flow chart of a process for establishing communications between an initiator and a target in accordance with one aspect of the disclosure.

Process Flows:

FIG. 2 illustrates a process for initiating a connection in accordance with one aspect of the disclosure herein. In one aspect, the dashed line down the middle of the figure indicates a separation between the actions of an initiator (on the left) and a target (on the right). As described above, an initiator may be the entire computing system 102, the adapter 116 or an application executed by the computing system 102. Starting at block 170, computing system 102 acting as an initiator uses its iSCSI layer 156A to send a TCP connection request (sometimes referred to as a SYN) to a target device or a system.

At block 172, the target receives the connection request, which is processed normally through a target communication stack 152, including the TCP layer 158B, described above with respect to FIG. 1C.

At block 174, the target sends a connection request and acknowledgement (while they could be separate, typically, one SYN+ACK message would be sent) and prepares a TCP connection. At block 176, the initiator receives the connection acknowledgement and, at block 178, sets up the TCP connection, which includes sending a further acknowledgement (ACK) to the target. At block 180, the target establishes the TCP connection.

After the connection is established, in block 182, the initiator further sends an iSCSI login request over the newly established TCP connection indicating an interest in bypassing the TCP layer. In one aspect, this message may be a part of an iSCSI payload in a frame (see payload 497 of frame 496, FIG. 4). At block 184, the target receives the iSCSI login request. In one aspect, the target may test network parameters, such as for example, that both the target and initiator are on a same network subnet and both are transmitting similar lossless traffic, and have the same Ethernet Traffic Class, in order to determine if it can respond positively to the request. As should be understood, a lossless traffic class will not drop frames due to an excessive number of packets. At block 186, the target sends an iSCSI login response indicating that it agrees to the TCP bypass connection. The target further completes the connection and sets up its ordering shim layer 164B to bypass TCP layer 158B processing. The target then waits for information from the initiator.

At block 188, the initiator receives the login response and, at block 190, sets up the iSCSI connection to use the ordering shim layer 164A to bypass TCP layer 158A processing. Once the connection is established, in block 192, the initiator can send transmit frames using the ordering shim 164A. In block 194, the target receive the frames and process them using the ordering shim 164B bypasses TCP layer 158B processing (block 194). As an example, the frames are described in more detail below with respect to FIG. 4.

In another aspect, the request for an efficient connection is an optional field in a TCP connection request (sometimes referred to as a SYN). The target receives the TCP connection request, which is processed normally through target communication stack. In such an aspect, processing the request then includes determining that the initiator wants to create an efficient connection to bypass TCP protocol processing. The target sends confirmation using the optional field in the TCP connection response (sometimes referred to as a SYN-ACK). If the optional field is present in the target response and indicates an agreement to establish a TCP bypass connection. Once the connection is established, both the initiator and the target process frames by bypassing TCP protocol processing; otherwise, a normal TCP connection is established and traffic is processed normally through the communication stack.

In one aspect, if the target receives an iSCSI login request at block 184, and it either does not support the TCP bypass or determines that certain criteria are not met, it may send a login response that supports opening a connection but indicates that transmissions should be processed normally through the communication stack (at block 186). In such a case, the connection can still be initiated without additional request traffic.

Figure 3:
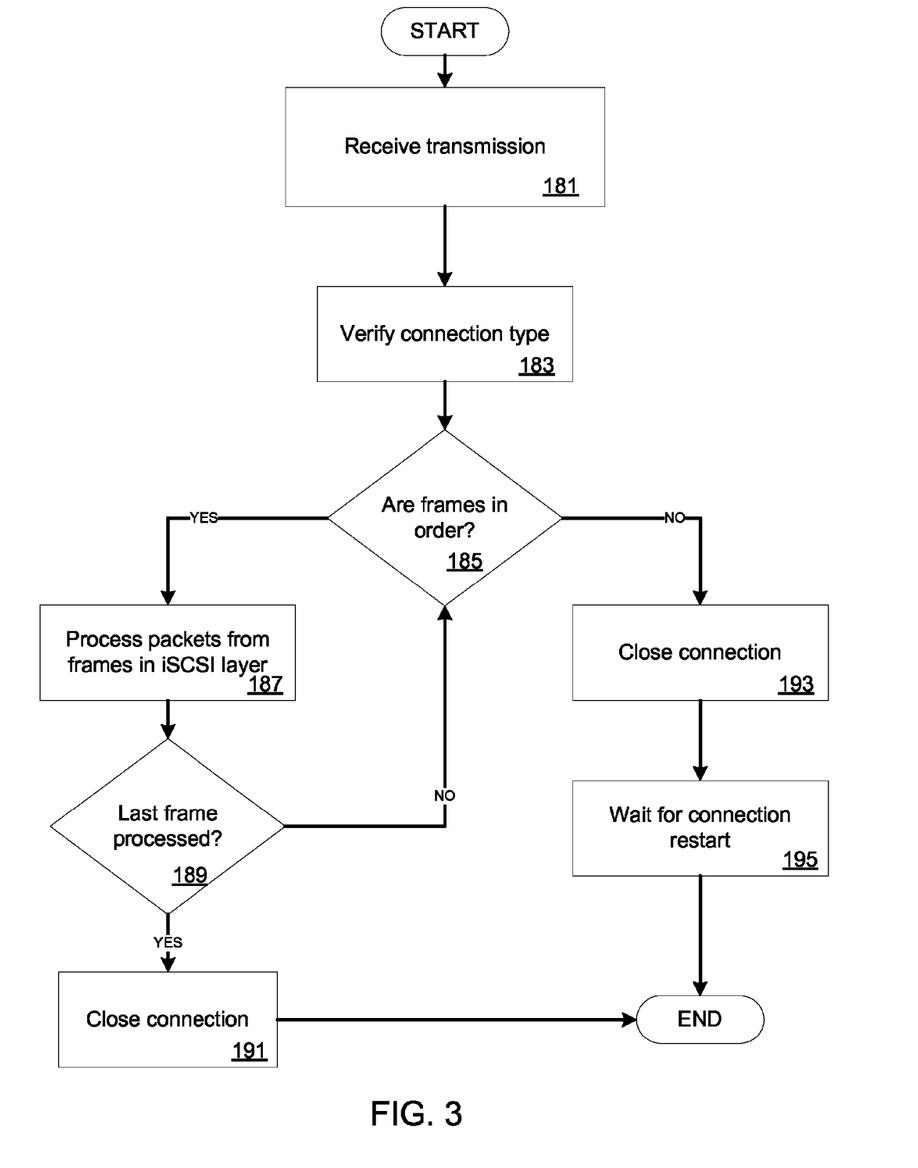
FIG. 3 is a flow chart for processing communications frames at a target, according to one aspect of the disclosure.

FIG. 3 shows a process flow for frame processing using the ordering shim layer without or with reduced TCP processing, as enabled by the communication processing module 148, according to one aspect. Starting with block 181, a transmission frame is received from the initiator device at the target device. This may be accomplished using the link layer 162B described above with respect to FIG. 1C.

At block 183, in one aspect, the connection type may be verified to understand that the frame is part of a connection set up to bypass the processing by the TCP layer 158B. At block 185, the ordering shim layer 164B checks to make sure that the frame has arrived in an expected order. In one aspect, a TCP or TCP-like header may be included in the transmission frame and a sequence number (for example, 498B in FIG. 4) may be utilized to help ensure that proper frame ordering is maintained. If the frame is received in order, then its contents are passed to the iSCSI layer 156B for processing in block 187. At block 189, the process checks to see if the last frame has been processed. If it has, the connection is closed at block 191 and the process ends. If it has not, the process returns to block 185 to process the next frame.

If, at block 185, the ordering shim layer 164B determines that the frame has not been received in order then the connection is closed at block 193, and the target then waits for the initiator to restart the connection at block 197. Due to the nature of the network fabric that provides useful context for this disclosure, it should be a rare occurrence for a frame to be received out of order or dropped. As such, the more limited processing handled by the ordering shim layer 164 should, overall, provide more efficient processing of network transmissions even if an occasional connection needs to be reset.

In another, aspect, when the frames are received out-or-order, the ordering shim layer 164B may buffer the frames for certain duration to make sure that an out-of-order frame is received. Once an out-of-order frame is received, the shim layer may then process the frame accordingly.

In one aspect, a flexible process and system for transmitting and processing frames are provided. Resource intensive, TCP frame processing may be disabled or enabled based on network/storage infrastructure needs. This is achieved by using the shim layer and communicating enabling or disabling TCP processing via the iSCSI payload.

Figure 4:
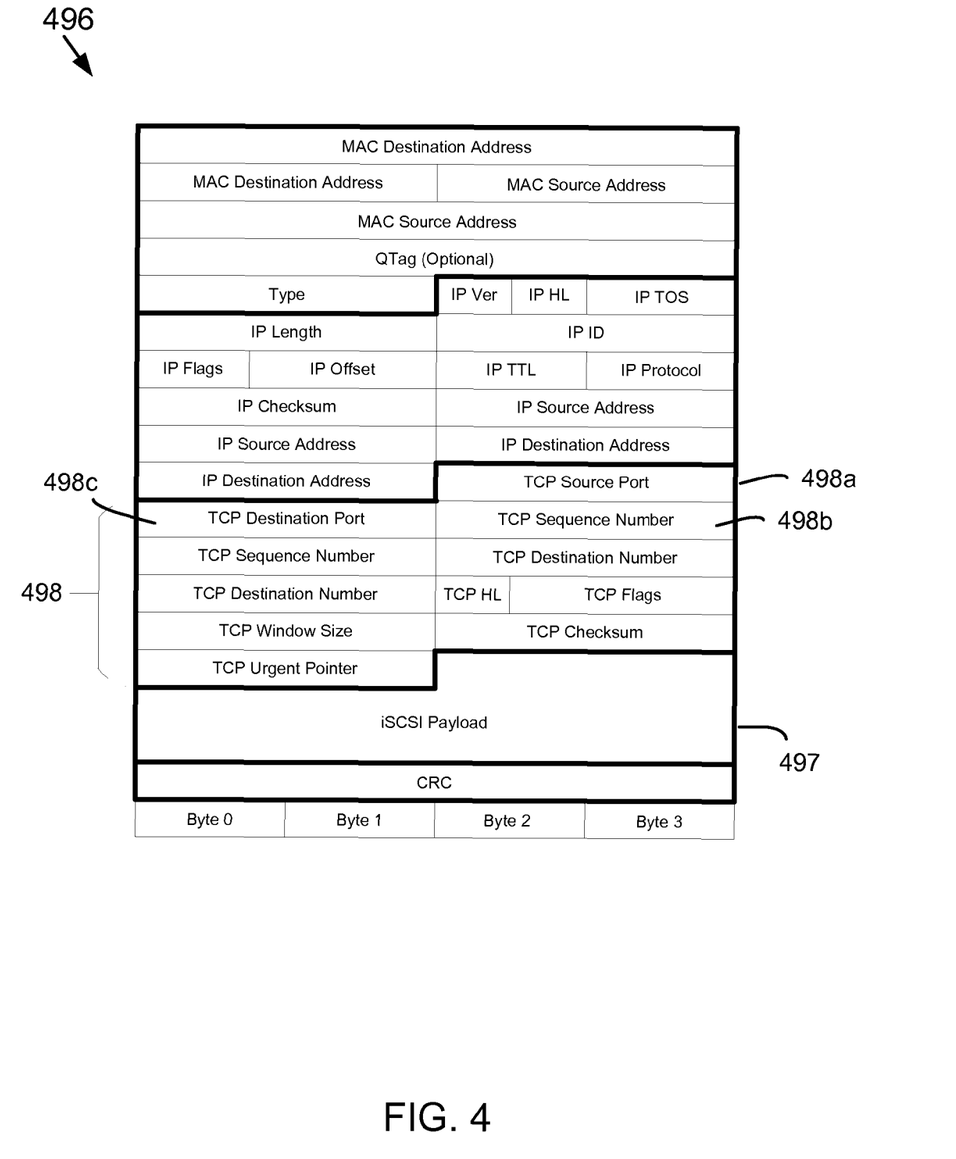
FIG. 4 shows an example of a frame format, used according to the various aspects of the present disclosure.

Frame Format:

FIG. 4 illustrates a sample network frame 496 as may be passed between an initiator and a target according to various aspects of the disclosure described above. In one aspect, network frame 496 operates as a standard iSCSI frame. As illustrated, the frame 496 includes a TCP block 498, which includes, among other elements a TCP source port 498a identifying a source TCP port that is sending the frame, a TCP sequence number 498b that is used to main frame ordering, and a TCP destination number 498c that identifies the destination port for the frame.

Frame 496 may also include an iSCSI payload 497. As described above, in one aspect, the frame may or may not be altered based on the inclusion of ordering shim 164A/164B processing. In general, the TCP source port 498a, destination port 498c, and the TCP sequence number 498b may be used in the ordering shim's processing (see, for example, FIG. 3 and sequence number 498b), while other aspects of the TCP block 498 may be ignored. In various implementations, some or all of the TCP block 498 may be used in processing the frame. For example, in one aspect, the frame includes a TCP header or block 498, and the iSCSI layer extracts at least one of the following from the TCP header: a port number (498a and/or 498c), a sequence number 498b, a header length, a reset flag, and/or a checksum field. In an example, the checksum field may be used to help ensure that the frame arrived at the target correctly. As described above with respect to FIG. 2, in one aspect, the iSCSI payload 497 may include setup information to request TCP bypass during an iSCSI login request. In another aspect, the TCP connection request may include processing for TCP bypass, wherein a TCP flag may indicate a bypass request, for example.

Frame 496 also includes a media access control (MAC) destination address, MAC source address and an optional QTag. Details of using these fields are not germane to the embodiments disclosed herein.

Although the present disclosure has been described with reference to specific embodiments, these embodiments are illustrative only and not limiting. For example, although the description above has been described with respect to a computing system and an adapter, other network devices, such as routers, switches, servers, or the like may be configured to perform the foregoing functions. The processing of various levels of the communications layers as described herein may also occur in different hardware and software/firmware modules than the specific examples set forth herein. For example, the shim ordering layer may be processed on a host or computing system 102, rather than on an adapter 116. Similarly, other protocols may be substituted for various levels of the communication stack without departing from the teachings of aspects of this disclosure. Additionally, the description herein provides a number of examples in relation to a storage system, but the teachings are equally applicable to other general or special purpose networking systems. Many other applications and embodiments of the present disclosure will be apparent in light of this disclosure and the following claims. References throughout this specification to "one embodiment" or "an embodiment" means that a particular feature, structure or characteristic described in connection with the embodiment is included in at least one embodiment of the present disclosure. Therefore, it is emphasized and should be appreciated that two or more references to "an embodiment" or "one embodiment" or "an alternative embodiment" in various portions of this specification are not necessarily all referring to the same embodiment. Furthermore, the particular features, structures or characteristics being referred to may be combined as suitable in one or more embodiments of the disclosure, as will be recognized by those of ordinary skill in the art.

What is claimed is:

1. A machine implemented method, comprising:
receiving a Transmission Control Protocol (TCP) connection request at a target device for a TCP connection from an initiator device;
accepting the TCP connection request by the target device;
receiving an Internet Small Computer System Interface (iSCSI) login request by the target device from the initiator device indicating a desire to bypass TCP layer processing for the TCP connection;
determining by the target device that network traffic with the initiator device is lossless and for a same traffic class;
sending a login response to the initiator device indicating an agreement to bypass the TCP layer processing;
transmitting frames from the initiator device using an ordering layer that bypasses TCP layer processing at the initiator device;
determining by an ordering layer at the target device that the frames received from the initiator device are in order; and
processing the frames using the ordering layer at the target device bypassing TCP layer processing.

2. The method of claim 1, wherein the processing the frames includes:
sending the frames to an Internet Small Computer System Interface (iSCSI) layer for additional processing.

3. The method of claim 2, further comprising:
closing the TCP connection when the frames are not delivered in order as determined by the ordering layer; and
attempting to start a new connection with the initiator device.

4. The method of claim 2, wherein the frames include a TCP header and the iSCSI layer extracts at least one of the following from the TCP header: a port number, a sequence number, a header length, a reset flag, and a checksum field.

5. The method of claim 1, wherein the target device accepts the login request when the initiator device is on a same subnet.

6. The method of claim 1, wherein the TCP connection request includes an optional field for indicating a desire to bypass TCP layer processing.

7. The method of claim 1, wherein the login response to the initiator indicates to use TCP layer processing when network traffic is not lossless.

8. A non-transitory, machine readable storage medium having stored thereon instructions for performing a method, comprising machine executable code which when executed by at least one machine, causes the machine to:
receive a Transmission Control Protocol (TCP) connection request at a target device for a TCP connection from an initiator device;
accept the TCP connection request by the target device;
receive an Internet Small Computer System Interface (iSCSI) login request by the target device from the initiator device indicating a desire to bypass TCP layer processing for the TCP connection;

determine by the target device that network traffic with the initiator device is lossless and for a same traffic class;

send a login response to the initiator device indicating an agreement to bypass the TCP layer processing;

transmit frames from the initiator device using an ordering layer that bypasses TCP layer processing at the initiator device;

determine by an ordering layer at the target device that the frames received from the initiator device are in order; and process the frames using the ordering layer at the target device bypassing TCP layer processing.

9. The non-transitory, machine readable storage medium of claim 8, wherein the code to process the frames includes code to:

send the frames to an Internet Small Computer System Interface (iSCSI) layer for additional processing.

10. The non-transitory, machine readable storage medium of claim 9, further comprising code to:

close the network connection, when the frames are not received in order as determined by the ordering layer; and attempt to start a new connection with the initiator device.

11. The non-transitory, machine readable storage medium of claim 9, wherein the frames include a TCP header and the iSCSI layer extracts at least one of the following from the TCP header: a port number, a sequence number, a header length, a reset flag, and a checksum field.

12. The non-transitory, machine readable storage medium of claim 8, wherein the target device accepts the connection request when the initiator device is on a same subnet.

13. The non-transitory, machine readable storage medium of claim 8, wherein the TCP connection request includes an optional field for indicating a desire to bypass TCP layer processing.

14. The non-transitory, machine readable storage medium of claim 8, wherein the login response to the initiator indicates to use TCP layer processing when network traffic is not lossless.

15. A system, comprising:
a memory containing machine readable medium comprising machine executable code having stored thereon instructions; and a processor module coupled to the memory, the processor module configured to execute the machine executable code to:

receive a Transmission Control Protocol (TCP) connection request at a target device for a TCP connection from an initiator device;

accept the TCP connection request by the target device;

receive an Internet Small Computer System Interface (iSCSI) login request by the target device from the initiator device indicating a desire to bypass TCP layer processing for the TCP connection;

determine by the target device that network traffic with the initiator device is lossless and for a same traffic class;

send a login response to the initiator device indicating an agreement to bypass the TCP layer processing;

transmit frames from the initiator device using an ordering layer that bypasses TCP layer processing at the initiator device;

determine by an ordering layer at the target device that the frames received from the initiator device are in order; and process the frames using the ordering layer at the target device bypassing TCP layer processing.

16. The system of claim 15, wherein the instructions to process the frames include instructions to:

send the frames to an Internet Small Computer System Interface (iSCSI) layer for additional processing.

17. The system of claim 16, further comprising instructions to:

close the network connection, when the frames are not received in order as determined by the ordering layer; and attempt to start a new connection with the initiator device.

18. The system of claim 16, wherein the frames include a TCP header and the iSCSI layer extracts at least one of the following from the TCP header: a port number, a sequence number, a header length, a reset flag, and a checksum field.

19. The system of claim 15, wherein the target device accepts the connection request when the initiator device is on a same.

20. The system of claim 15, wherein the TCP connection request includes an optional field for indicating a desire to bypass TCP layer processing.

* * * * *